(12) United States Patent
Bae et al.

(10) Patent No.: US 7,249,936 B2
(45) Date of Patent: *Jul. 31, 2007

(54) DUAL CAPACITY COMPRESSOR

(75) Inventors: Young Ju Bae, Kyongsangnam-do (KR); Jong Bong Kim, Kyongsangnam-do (KR); Chul Gi Roh, Kyongsangnam-do (KR); Jae Sung Sim, Kyongsangnam-do (KR); Dal Soo Kang, Kyongsangnam-do (KR); Min Young Seo, Kyongsangnam-do (KR); Hyun Kim, Kyongsangnam-do (KR); Kyoung Jun Park, Kyongsangnam-do (KR); Kee Joo Kim, Kyongsangnam-do (KR); Hee Hyun Kim, Kyongsangnam-do (KR)

(73) Assignee: LG Electronics Inc., Seoul (KR)

( * ) Notice: Subject to any disclaimer, the term of this patent is extended or adjusted under 35 U.S.C. 154(b) by 401 days.

This patent is subject to a terminal disclaimer.

(21) Appl. No.: 10/847,387

(22) Filed: May 18, 2004

(65) Prior Publication Data

US 2004/0265139 A1 Dec. 30, 2004

Related U.S. Application Data

(63) Continuation of application No. 10/077,939, filed on Feb. 20, 2002, now Pat. No. 6,755,624.

(30) Foreign Application Priority Data

Jun. 1, 2001 (WO) .................... PCT/KR01/00941

(51) Int. Cl.
*F04B 1/06* (2006.01)
*F01B 31/14* (2006.01)

(52) U.S. Cl. .......................................... 417/221; 92/13
(58) Field of Classification Search ............. 417/221; 92/13, 140

See application file for complete search history.

(56) References Cited

U.S. PATENT DOCUMENTS

| 4,245,966 | A | | 1/1981 | Riffe ......................... 417/539 |
| 4,479,419 | A | | 10/1984 | Wolfe ......................... 92/13.3 |
| 4,494,447 | A | | 1/1985 | Sisk ........................... 92/13.3 |
| 5,951,261 | A | * | 9/1999 | Paczuski ..................... 417/315 |
| 6,092,993 | A | | 7/2000 | Young et al. ................. 417/53 |
| 6,190,137 | B1 | | 2/2001 | Robbins et al. ............. 317/221 |
| 6,217,287 | B1 | | 4/2001 | Monk et al. .................. 417/45 |
| 6,755,624 | B2 | * | 6/2004 | Bae et al. .................... 417/221 |

FOREIGN PATENT DOCUMENTS

| JP | 56-63494 | | 5/1981 |
| JP | 5765888 | A | 4/1982 |
| JP | 11257110 | A | 9/1999 |
| JP | 11294210 | A | 10/1999 |

* cited by examiner

Primary Examiner—Charles G. Freay
(74) Attorney, Agent, or Firm—Ked & Associates, LLP

(57) ABSTRACT

A dual capacity compressor, which can maintain a fixed eccentricity and stable operation, even when the compressor is rotated in both the regular and reverse directions in order to provide multiple compression capacities, is provided. This dual capacity compressor implements an improved key member and associated key member fitting parts to inhibit relative motion of the crank pin and the eccentric sleeve during operation, so as to reduce or eliminate a destabilizing effect due to centrifugal forces on the eccentric sleeve and external forces applied through the connecting rod.

30 Claims, 17 Drawing Sheets

DUAL CAPACITY COMPRESSOR

This is a continuation of U.S. patent application Ser. No. 10/077,939 filed Feb. 20, 2002, now U.S. Pat. No. 6,755,624 which is incorporated herein by reference.

TECHNICAL FIELD

The present invention relates to compressors for compressing a working fluid, such as refrigerant, to a required pressure, and more particularly, to a compressor of which compression capacity changes with a direction of rotation.

BACKGROUND ART

The dual capacity compressor is a kind of reciprocating type compressor of which piston stroke as well as a compression capacity vary with an eccentric sleeve rotatably coupled to a crank pin of a crankshaft, a position of which with respect to the crank pin is dependent on a direction of rotation of the motor and the crankshaft. Since the dual capacity compressor has a compression capacity that can be varied with a required load, the dual compressor is used widely in apparatuses which require compression of working fluid, particularly in home appliances operative in a refrigeration cycle, such as a refrigerator, for enhancing an operation efficiency. A U.S. Pat. No. 4,236,874 discloses a general dual capacity compressor, referring to which a related art dual capacity compressor will be explained, briefly. FIG. 1 illustrates a section of a dual capacity compressor disclosed in U.S. Pat. No. 4,236,874, and FIG. 2 illustrates operation of the dual capacity compressor, schematically.

Referring to FIG. 1, the dual capacity compressor is provided with a piston 7 in a cylinder 8, a crankshaft 1, a crank pin 3 having a center 3a eccentric from a center of the crankshaft 1a, an eccentric ring 4 coupled on the crank pin 3, and a connecting rod 6 connected to the eccentric ring 4 and the piston 7, as key components. The eccentric ring and the connecting rod 6 are rotatable both with respect to the other, and the center 3a of the crank pin. There are release areas 9 in contact surfaces of the crank pin 3 and the eccentric ring 4, and a key 5 for coupling the crank pin 3 and the eccentric ring 4 together fitted in the release areas for coupling the crank pin 3 and the eccentric ring 4. The operation of the dual capacity compressor with respect to the compression capacity will be explained.

Referring to FIG. 2, in the dual capacity compressor, a stroke of the piston 7 is regulated by an eccentricity varied with a position of the eccentric ring 4, and, if a large capacity is required, the crank shaft 1 is rotated in a clockwise direction (regular direction) and, if a small capacity is required, the crank shaft 1 is rotated in a counter clockwise direction (reverse direction). In detail, FIG. 2A illustrates a moment the piston 7 is at a top dead center during a clockwise rotation, and FIG. 2B illustrates a moment the piston 7 is at a bottom dead center during a clockwise rotation, when the stroke Lmax is the greatest because the eccentricity is the greatest. And, FIG. 2C illustrates a moment the piston 7 is at a bottom dead center during a counter clockwise rotation, and FIG. 2D illustrates a moment the piston 7 is at a top dead center during a counter clockwise rotation, when the stroke Lmin is the smallest because the eccentricity is the smallest.

However, during the foregoing operation, the crank pin 3 and the eccentric ring 4 are involved in centrifugal forces, respectively caused by their rotation around the center 1a of the crank shaft, exerting on a point between the shaft center 1a and the pin center 3a, and a point on a line extended from the shaft center 1a to the a center of gravity of the ring 4a, respectively. Therefore, different from FIGS. 2A and 2B, as lines of actions are not one the same line, a local rotating moment is occurred at the eccentric ring 4 as a product of a vertical distance 'd' to the pin 3 and its own centrifugal force, acting in a direction the same with a direction (counter clockwise direction) of rotation of the crank shaft 1. Since the crank pin 3 and the eccentric ring 4 are members that can make relative movement to each other, the rotating moment causes a relative rotation of the eccentric ring 4 in a direction of rotation of the crank shaft 1, releasing the key 5 from the crank pin 3 and the eccentric ring 4, and leaving the eccentric ring 4 and the key 5 to move together as shown in FIG. 3.

Moreover, as shown in FIG. 3, during operation, for an example, in the clockwise direction, a pressure 'P' (a pressure of re-expansion of the working fluid) in the cylinder after compression pushes the eccentric ring 4 to a direction of rotation of the crank shaft 1, to cause the eccentric ring 4 to make a relative rotation with respect to the crank pin 3 in a rotation direction of the crank shaft. At the end, such a relative rotation makes operation of the compressor unstable, and performance of the compressor poor.

In fact, the relative rotation is occurred because the key 5 cannot fix the crank pin 3 and the eccentric ring, perfectly. The key 5 rolls within the release area whenever the direction of rotation of the crank shaft is changed, to cause serious wear at respective contact surfaces, that shortens a lifetime of the compressor.

In the meantime, other than the U.S. Pat. No. 4,236,874, there are many patent publications that disclose technologies of the dual capacity compressors, which will be explained, briefly.

Similarly, U.S. Pat. No. 4,479,419 discloses a dual capacity compressor provided with a crank pin, eccentric cam and a key. The key is fixed to the eccentric cam, and moves along a track in a crank pin when a direction of rotation of the compressor is changed. However, since the key cannot fix the crank pin and the eccentric cam perfectly, the U.S. Pat. No. 4,479,419 also has unstable operation caused by the relative rotation.

U.S. Pat. No. 5,951,261 discloses a compressor having an eccentric part with a bore of a fixed inside diameter formed across the eccentric part, and an eccentric cam with another bore with a diameter the same with the eccentric part formed at one side thereof. A pin is provided to the bore in the eccentric part, and a compression spring is provided to the bore in the eccentric sleeve. Accordingly, when the bores are aligned during rotation, the pin moves to the bore in the cam by a centrifugal force, that couples the eccentric part and the eccentric cam, together. However, since the U.S. Pat. No. 5,951,261 is provided with only one bore in the eccentric cam, the U.S. Pat. No. 5,951,261 can couple the eccentric part and the eccentric cam together only when the compressor rotates in a particular direction. Moreover, an operation reliability cannot be secured, since an exact movement of the pin from the eccentric part to the cam through respective bores is difficult.

DISCLOSURE OF INVENTION

Accordingly, the present invention is directed to a dual capacity compressor that substantially obviates one or more of the problems due to limitations and disadvantages of the related art.

An object of the present invention is to provide a dual capacity compressor which can maintain a fixed eccentricity and make a stable operation even if the compressor is rotated in any directions that have different compression capacity.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

As explained, the inventor understands that the unstable operation of the dual capacity compressor is caused by a local centrifugal force of the eccentric sleeve, and an external load through the connecting rod and etc., during operation. Though such causes are not avoidable as far as an eccentric mechanism is used, the inventor understand that, if the crank pin and the eccentric sleeve can be fixed positively during operation, such a problem can be solve. Taking an idea of a key member that has such a fixing structure, the key member and members related thereto are modified as follows so that the relative motion between the crank pin and the eccentric sleeve can be prevented.

To achieve these and other advantages and in accordance with the purpose of the present invention, as embodied and broadly described, the dual capacity compressor includes a power generating part including a reversible motor and a crank shaft inserted in the motor, a compression part including a cylinder, a piston in the cylinder, and a connecting rod connected to the piston, a crank pin in an upper part of the crank shaft eccentric to a center of the crank shaft, an eccentric sleeve having an inner circumferential surface rotatably coupled on an outer circumferential surface of the crank pin, and an outer circumferential surface for rotatable coupling of an end of the connecting rod, and a key member for making the eccentric sleeve to be caught at the crank pin completely in both clockwise and counter clockwise direction rotation of the motor.

Preferably, the key member is in contact with the eccentric sleeve at a plurality of points, and more preferably, at two points set up with reference to a center line in any direction during operation.

Preferably, the key member includes a first projection for projection for a length from the crank pin even when the compressor is not in operation, and a second projection for projection for a length from the crank pin when the compressor is in operation, and for doing this, it is more preferable that a distance between ends of the first and second projections has a length greater than an outer diameter of the crank pin.

The crank pin includes one pair of key member fitting parts formed opposite to each other oriented on a sloped extension line with reference to a horizontal plane.

The key member fitting part may be a pass through hole formed in a wall of the crank pin or at least one slot extended from a position of the wall of the crank pin to a top thereof. It is preferable that the crank pin is extended higher than the eccentric sleeve.

The eccentric sleeve includes a track part formed along a circumference thereof for facilitating rotation of the eccentric sleeve itself relative to the projection of the key member, and a limiting part formed relative to the track part for limiting rotation of the projection of the key member.

The track part of the eccentric sleeve may be a pass through hole extended for a length along a circumferential direction at a depth from a top thereof, or a cut away part extended along a circumferential direction at a depth from the top.

It is preferable that the steps formed between the track part and the limiting part are parallel to an extension line connecting a center of rotation of the crank shaft and a center of the crank pin, and, more preferably, spaced as much as a half of a thickness of the key member. The steps may be sloped at an angle with respect to an extension line connecting the rotation center of the crank shaft and the center of the crank pin. The eccentric sleeve may further include oil supply holes formed opposite to each other at a height.

The key member includes a first projection projected for a length from the crank pin and engaged with one step on the eccentric member, a stopper for limiting a length of projection of the first projection, and a second projection projected opposite to the first projection during rotation and engaged with the other step of the eccentric sleeve.

Preferably, the first and second projections of the key member have the same thickness, and have sections of circular, rectangular, or hexagonal. Preferably, the first projection has a length of projection from an outer circumference of the crank pin greater than a half of a width of the step, and the second projection has such a length that an end thereof is not projected from the outer circumference of the crank pin when the compressor is not in operation.

The first stopper may have a crank pin contact surface in conformity with an inner circumferential surface of the crank pin, or be of a separable type.

The separable type first stopper may be inserted in a circumferential groove in the key member and fixed by a fixing member.

The key member may further include an elastic member for supporting the key member such that a part of the key member is kept projected out of the crank pin regardless of operation of the compressor, and for doing this, the stopper further includes a receiver for the elastic member.

It is preferable that the key member may further include a second stopper for limiting a length of projection of the second projection out of the crank pin according to a direction of action of the centrifugal force. The second stopper may be a hollow tube member movably fitted in a longitudinal direction of the second projection, a longitudinal extension of the first stopper having a diameter greater than a diameter of the second projection, or a radial direction extension of the second projection having a thickness.

Thus, the present invention can prevent a relative rotation between the crank pin and the eccentric sleeve, thereby enhancing a stable operation and efficiency of the compressor.

It is to be understood that both the foregoing general description and the following detailed description are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Reference will now be made in detail to the preferred embodiments of the present invention, examples of which are illustrated in the accompanying drawings. In explaining embodiments of the present invention, same parts will be given the same names and reference symbols, and additional explanations of which will be omitted. An overall structure of the dual capacity compressor of the present invention will be explained, with reference to FIG. 4.

Figure 1:
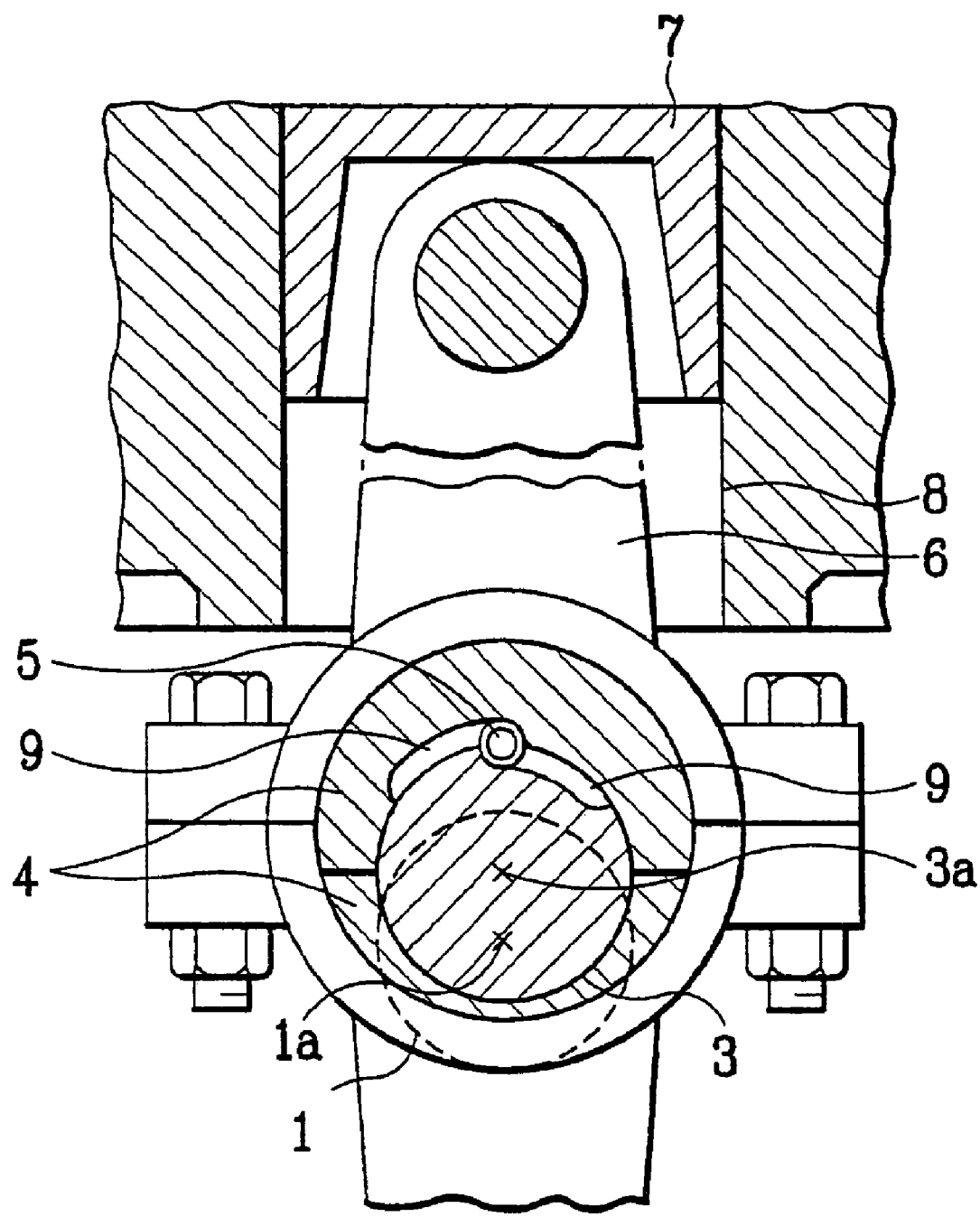
FIG. 1 illustrates a section of a related art dual capacity compressor.
Figure 2:
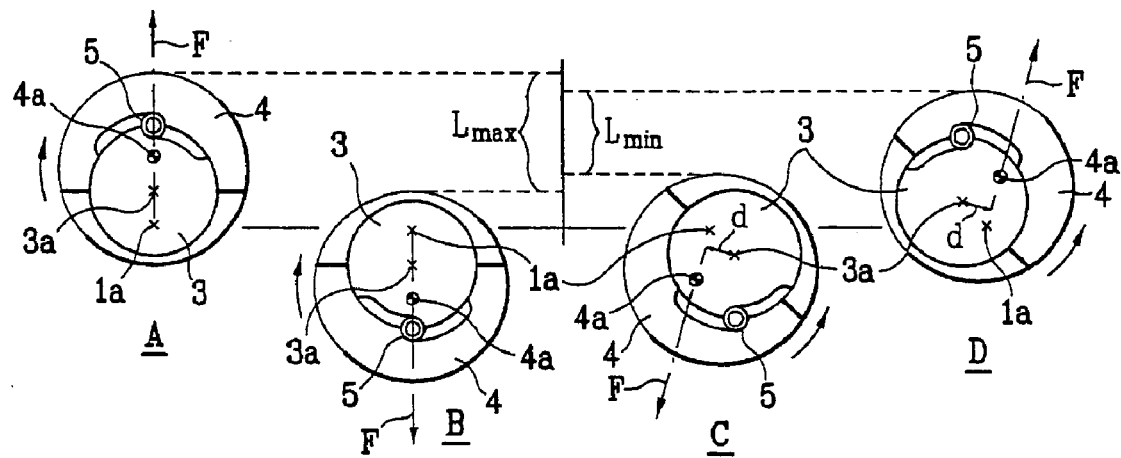
FIG. 2 illustrates the operation of the related art dual capacity compressor in FIG. 1, schematically.
Figure 3:
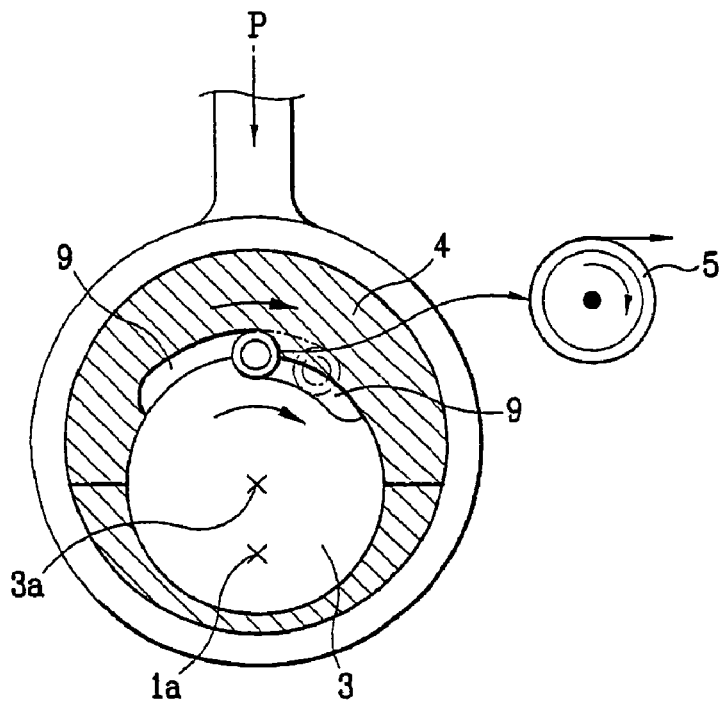
FIG. 3 illustrates a section of key parts of a related art dual capacity compressor showing relative rotation between the crank pin and the eccentric sleeve, schematically.
Figure 4:
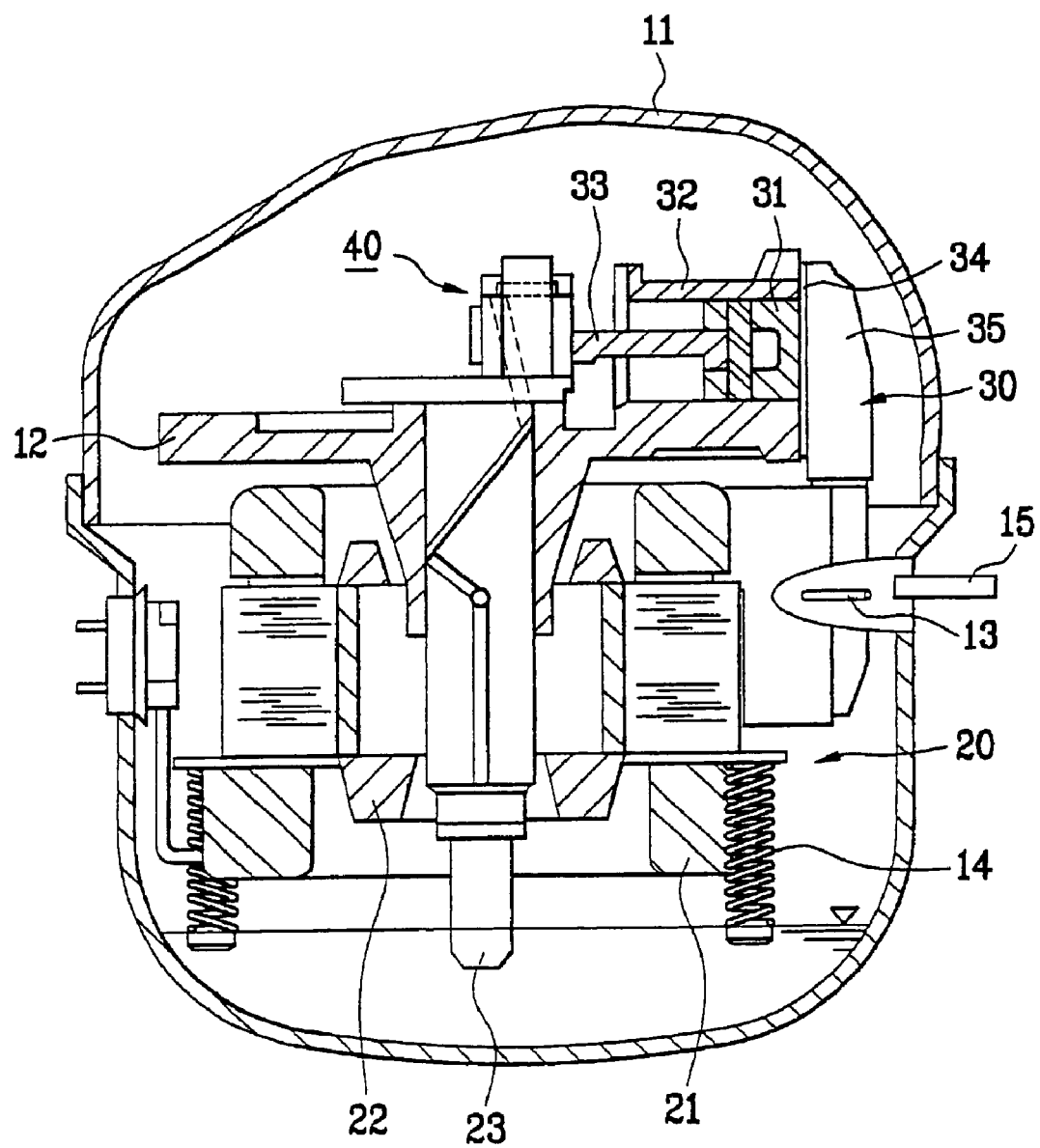
FIG. 4 illustrates a section of a dual capacity compressor in accordance with a preferred embodiment of the present invention.

Referring to FIG. 4, the dual capacity compressor of the present invention includes a power generating part 20 in a lower portion of the compressor for generating and providing a required power, and a compression part 30 for compressing working fluid by using the provided power. Moreover, in addition to this, the dual capacity compressor includes a stroke varying part 40 connecting the power generating part 20 to the compression part 30 for varying a compression capacity during operation. The power generating part 20 and the compression part 30 are enclosed by a shell 11 for preventing refrigerant from leaking, and there are a plurality of supporting members (i.e., springs) fitted to an inside of the shell for supporting a frame 12, elastically. There are a refrigerant inlet 13 and a refrigerant outlet 15 fitted to, and in communication with an inside of the shell.

The power generating part 20 under the frame 12 includes a motor with a stator 21 and rotator 22 for generating a rotating force by an external electrical power, and a crank shaft 23. The motor is rotatable in a clockwise or anti-clockwise rotation. The crank shaft 23 has a lower part inserted in the rotator 22 for transmission of a power, with an oil hole or groove for supplying lubrication oil accommodated in the lower part to respective driving parts.

The compression part 30 is fitted on the frame 12 above the power generating part 20 and includes a mechanical driving part for compression of the refrigerant and a suction and discharge valves for assisting the driving part. The driving part that actually forms a compression space together with a cylinder 32 has piston 31 for reciprocating in the cylinder 32, and a connecting rod 33 for transmission of reciprocating power to the piston 31. The valves receive and discharge refrigerant to/from the cylinder in combination with a cylinder head 34 and the head cover 35.

The stroke varying part 40 of the dual capacity compressor of the present invention will be explained, while explanation of the power generating part and the compression part, which are identical to the related art, are omitted.

The stroke varying part 40 includes a crank pin on top of the crank shaft in eccentric from the crank shaft, an eccentric sleeve rotatably fitted between an outer surface of the crank pin and the connecting rod, and a key member for fixing the crank pin and the eccentric sleeve together. This structure facilitates rearrangement of the eccentric sleeve depending on a direction of rotation (clockwise or counter clockwise) of the motor, that changes eccentricity and displacement of the piston, to change a compression capacity.

In the present invention, basically the key member has a length greater than a diameter of the crank pin movably fitted in the crank pin, so that at least a part of the key member is projected from the crank pin even if the compressor is stopped, and the other end thereof is projected from the crank pin during the compressor is in operation by a centrifugal force. Therefore, the key member is in contact with the eccentric sleeve at a plurality of points, and more particularly, the key member is in contact with two points of the eccentric member set up with reference to a center line of any direction on the same time during operation, actually. Eventually, the key member makes the eccentric sleeve to be engaged with the rotating crank pin completely, thereby preventing the eccentric sleeve and the crank pin from making a relative movement to the other. The foregoing dual capacity compressor of the present invention will be explained in detail taking first and second embodiments of the present invention as examples.

FIRST EMBODIMENT

Figure 5A:
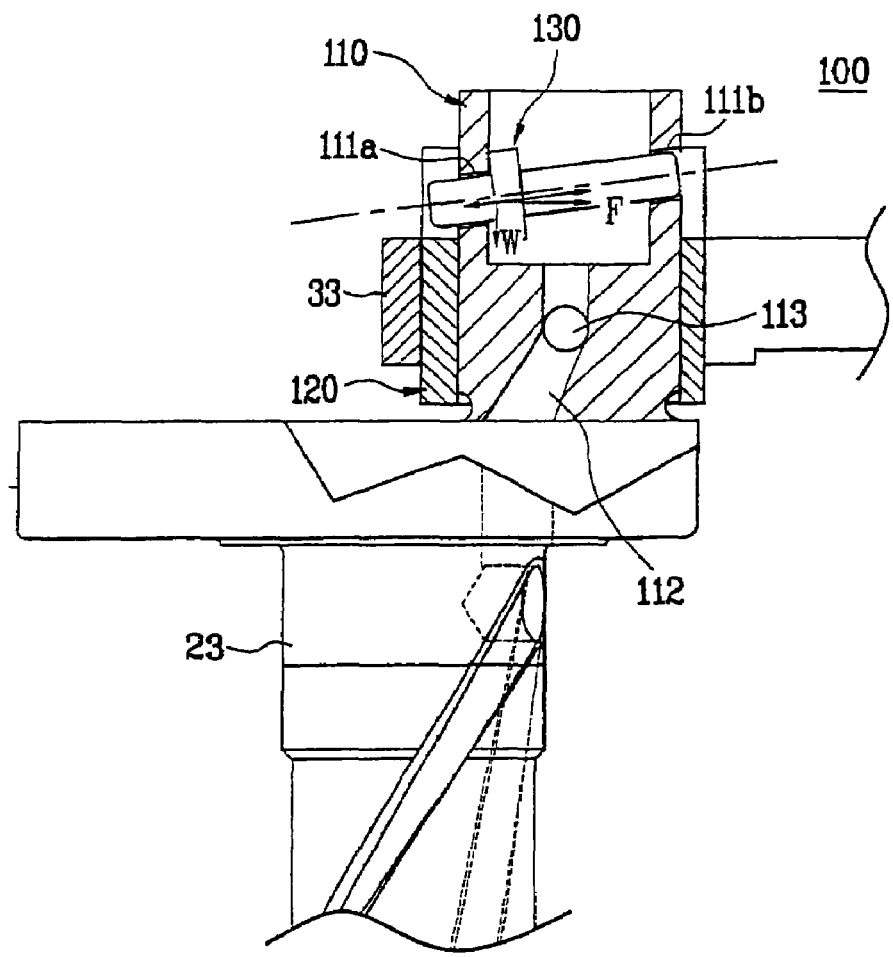
FIG. 5A illustrates a side view with a partial section of a dual capacity compressor in accordance with a first preferred embodiment of the present invention.
Figure 5B:
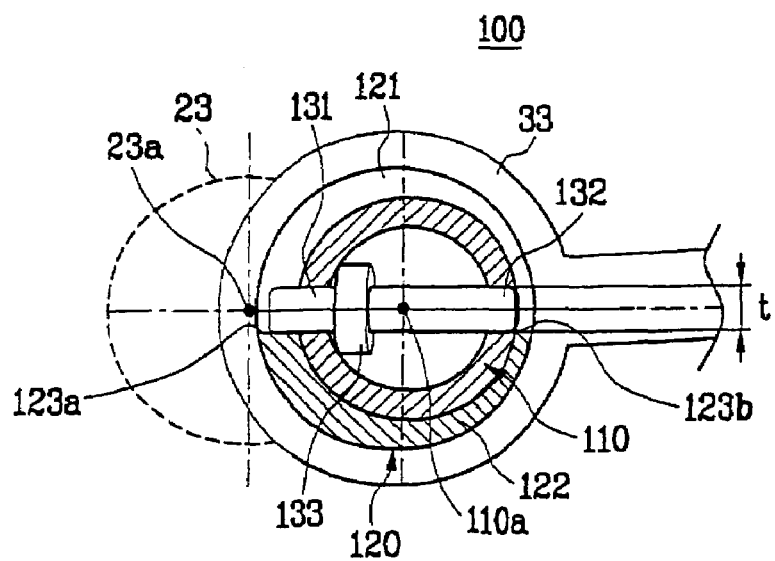
FIG. 5B illustrates a plan view with a partial section of a dual capacity compressor in accordance with a first preferred embodiment of the present invention.

FIGS. 5A and 5B illustrate side and plan views a dual capacity compressor in accordance with a first preferred embodiment of the present invention, wherein components thereof are shown in assembled states with partial sections for easy explanation and clarity. FIGS. 6A~11C illustrate the components individually, referring to which the first preferred embodiment of the present invention will be explained.

Figure 6A:
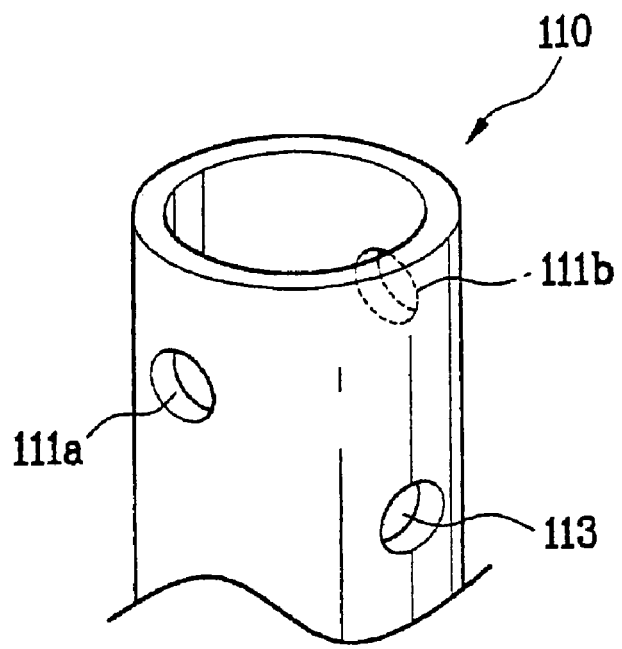
FIG. 6A illustrates a perspective view of a crank pin in accordance with a first preferred embodiment of the present invention.
Figure 6B:
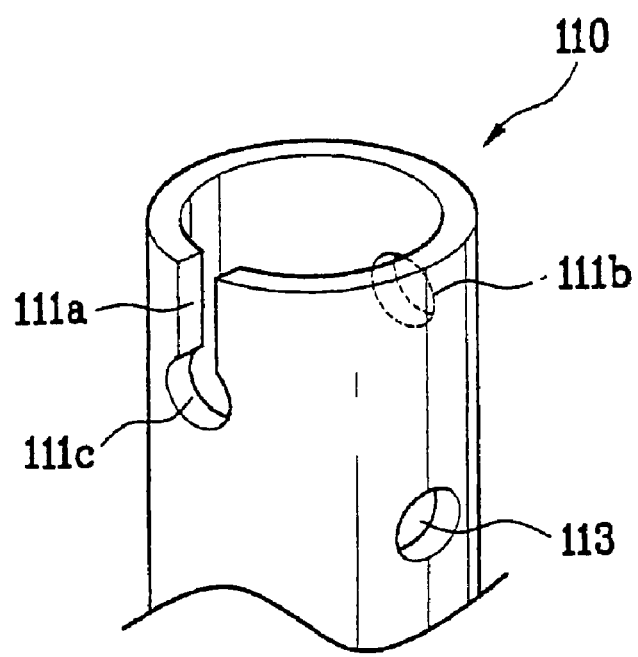
FIG. 6B illustrates a perspective view of a crank pin modified from one in FIG. 6A.

The dual capacity compressor in accordance with a first preferred embodiment of the present invention includes a crank pin 110 having a pair of opposite key member fitting parts 111 at slanted positions, an eccentric sleeve 120 for partial limitation of rotation of a projection of the key member, and a key member 130 for fitting through the key member fitting parts 111 such that at least a part thereof is projected from the crank pin 110. The dual capacity compressor includes other components identical to the components in FIG. 4. A weight 'W' force component of the key member 130 caused by the sloped disposal regulates movement and position of the key member 130. That is, at least a part of the key member is projected from the crank pin 110 by the weight 'W' when the compressor is not in operation. As shown in FIG. 5A, the crank pin 110 is hollow partially, and has an oil passage 112 and an oil supply hole 113, as well as the key member fitting parts 111. The fitting parts 111a and 111b are formed in the hollow tube part so as to be disposed in a vertical plane containing the crank shaft center 23a and the crank pin center 110a. As described, the fitting parts 111a and 111b are disposed on an extension of line sloped at an angle to a horizontal plane. Accordingly, the key member 130 in the fitting parts 111a and 111b has influences of force components of the weight of the key member 130 itself and a centrifugal force F on the extension line between the centers 23a and 110a exerted thereon. As shown in FIG. 6A, the fitting parts 111a and 111b actually form a pass through hole in the first embodiment. This pass through hole can prevent the key member 130 from falling off during operation of the compressor. Preferably, as shown in FIG. 6B, at least one of the fitting parts 111a and 111b may be a slot extended from a top end of a wall of the crank pin 110 to a position, for easy fitting of the key member 130 to the crank pin 110. It is more preferable that there is a seat part 111c at an end of the fitting part for stable fitting of the key member 130. The oil passage 112 is in communication both with the oil groove in outside surface of the crank shaft 23, and the oil supply hole 113. The oil supply hole 113 is formed along a line perpendicular to an extension line connecting the fitting parts 111a and 111b (i.e., an extension line between the centers 23a and 110a). The lubrication oil on the bottom of the compressor is at first passed through the oil groove and the oil passage 112, and sprayed so as to be supplied between contact surfaces of the components during operation for prevention of wear and smooth operation of the components, and may be supplied to a gap between the crank pin 110 and the eccentric sleeve 120 directly through the oil supply hole 113. Preferably, the crank pin 110 is formed higher than the eccentric sleeve 120, for spraying the lubrication oil to the components evenly from the high position.

The eccentric sleeve 120 in the first embodiment basically has an inner circumferential surface rotatably coupled to an outer circumferential surface of the crank pin, and an outer circumferential surface rotatably coupled to an end of the connecting rod 33. In detail, as shown in 7A, the eccentric sleeve 120 includes a track part 121 formed along a circumference thereof, and a limiting part 122 for limiting a track of the track part 121. There are two steps 123a and 123b between the track part 121 and the limiting part 122. The track part 121 facilitates rotation of the eccentric sleeve 120 itself relative to the projected part when the key member 130 is stopped. Since at least a part of the key member 130 is projected when the compressor is not in operation, the eccentric sleeve 120 can rotate round the crank pin 110 as much as a range the track part 120 is formed therein when the compressor is not in operation. During stoppage and movement relative to the track part 121, the limiting part 122 limits rotation of the sleeve by the projection of the key member 130, as the projections of the key member 130 are barred at the steps 123.

Figure 7A:
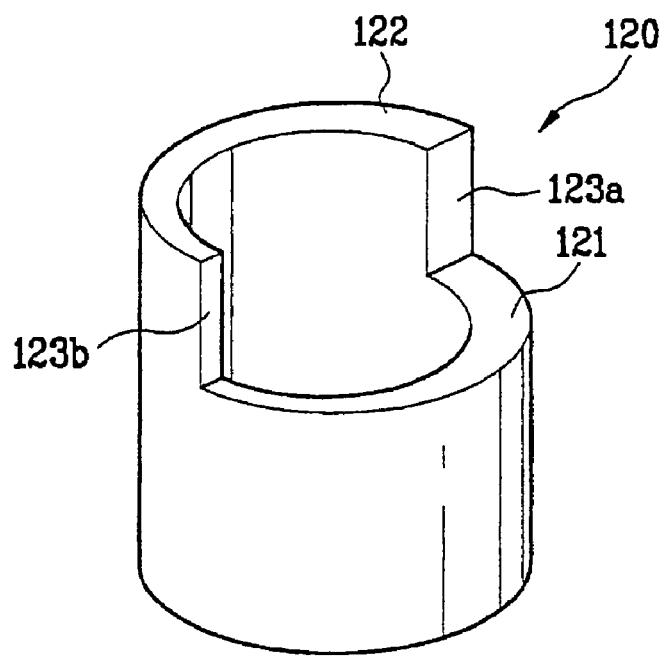
FIG. 7A illustrates a perspective view of an eccentric sleeve in accordance with a first preferred embodiment of the present invention.
Figure 7B:
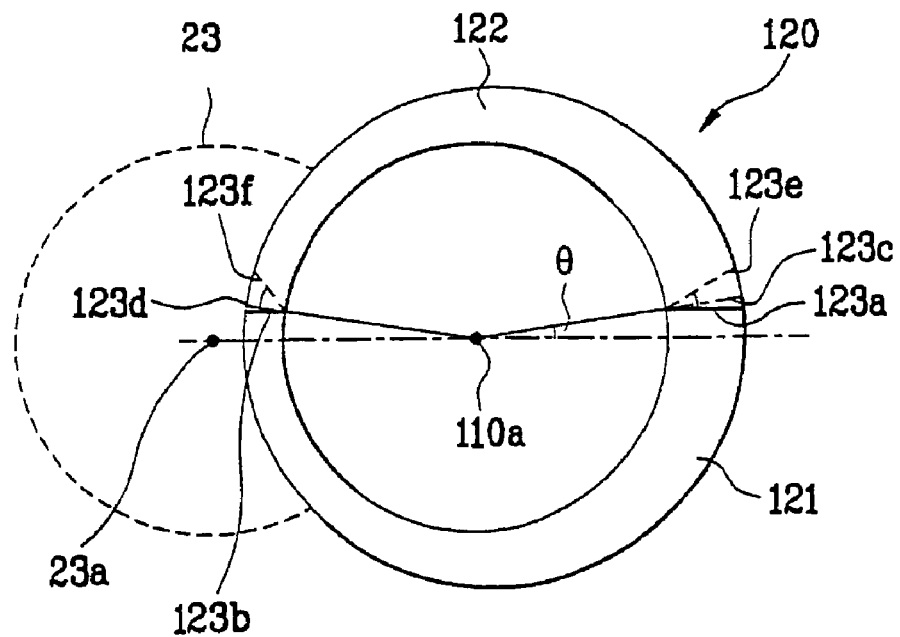
FIGS. 7B and 7C illustrate a plan view, and a side view of eccentric sleeves modified from one in accordance with the first preferred embodiment of the present invention.

The track part 121 may be a cut away part extended along a circumference starting from top end of the eccentric sleeve 120 to a required depth, actually. As shown in FIGS. 5B and 7B, the steps 123a and 123b are formed parallel to an extension line between the crank shaft center 23a and the crank pin center 110a at first. That is, the steps 123a and 123b are actually formed in parallel to an extension line between a maximum thickness and a minimum thickness of the eccentric sleeve to have a different thickness, and the extension line are on the extension line between the centers 23a and 110a. The steps 123a and 123b are positioned on an extension line parallel to the extension line of the centers 23a and 110a, on the same time. Consequently, the key member 130 disposed on the same extension line can be barred at the steps 123, such that the steps 123 form common contact surfaces for the key member 130, actually. Preferably, the steps 123a and 123b are away from the extension line between the centers 23a and 110a by a half of a thickness 't' of the key member 130. according to this, the key member 130 can make be barred more stably and accurately. On the other hand, the steps 123a and 123b may be formed to have sloped at an angle with respect to the extension line between the centers 23a and 110a. More particularly, the steps 123c and 123d may be formed along a radial direction extension line of the crank pin center 110a sloped with respect to the extension line between the centers 23a and 110a. Also, the steps 123e and 123f may be formed sloped at an angle toward the limiting part centered on a cross point with an inner circumference. Even the above cases, the steps 123c, 123d, 123e and 123f have at least common contact points, to permit engagement.

Figure 7C:
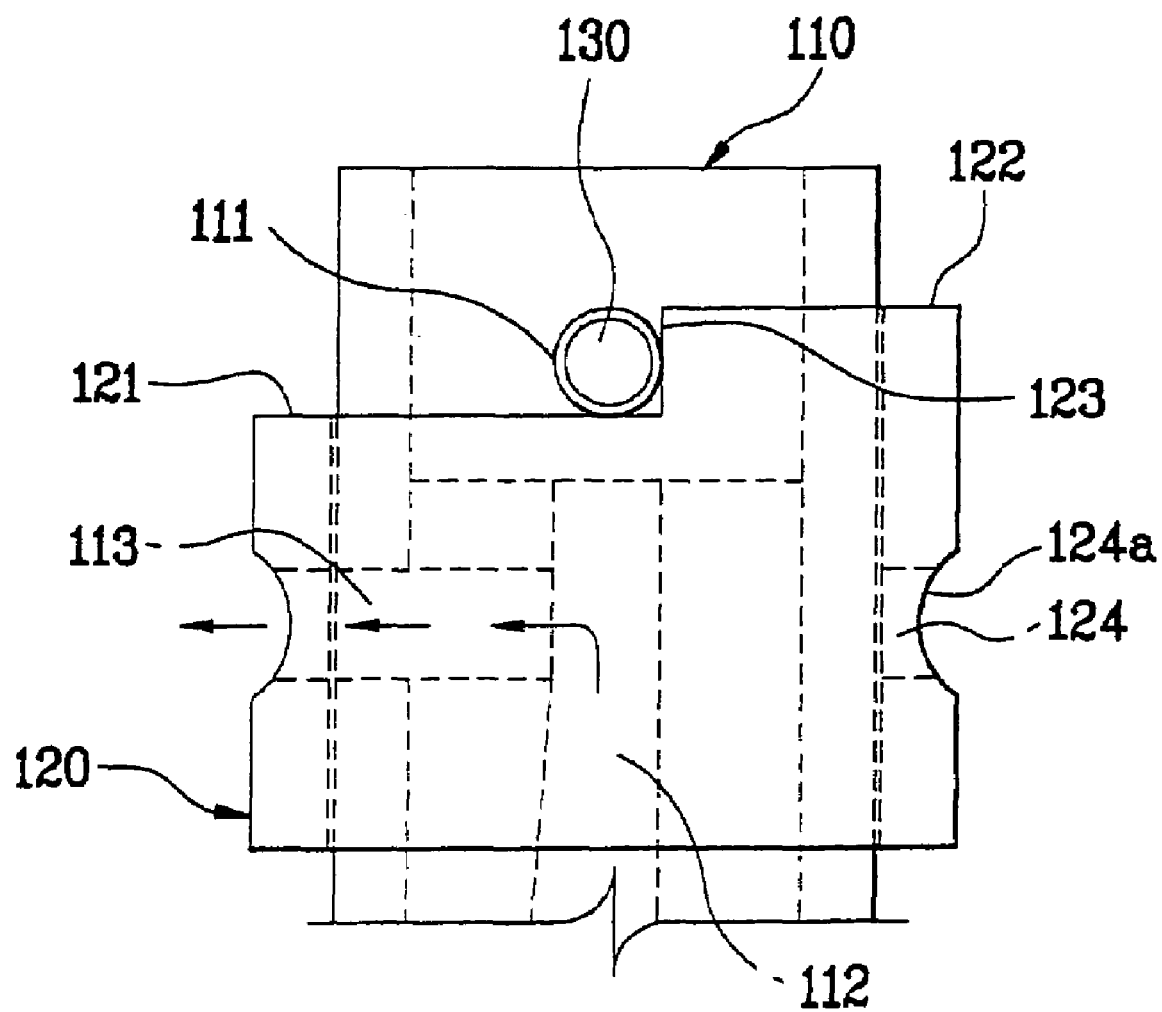

Referring to FIG. 7C, the eccentric sleeve 120 may further include oil supply holes 124 formed oppositely at a height. The oil supply holes 124 may be through holes formed symmetry with respect to the extension line between the centers 23a and 110a, such that the oil supply hole 124 is in communication with the oil supply hole 113 in the crank pin when the key member 130 is barred by the eccentric sleeve 110. Therefore, during operation of the compressor, one of the two oil supply holes 124 is in communication with the oil supply hole 113 regardless of the direction of rotation, allowing the lubrication oil supplied to the eccentric sleeve 120 and the connecting rod 33. In addition to this, an oil groove 124a is formed around the oil supply hole 124 to a depth, for forming a space for distributing the oil around the oil supply hole 124, thereby making supply of lubrication oil between the eccentric sleeve 120 and the connecting rod 33 easy.

Figure 8:
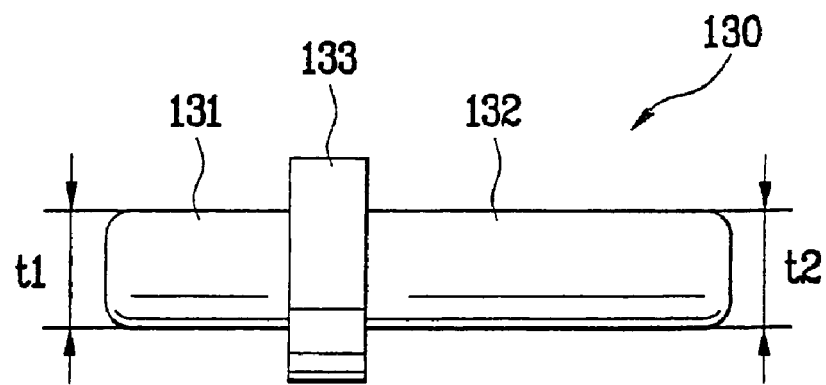
FIG. 8 illustrates a perspective view of a key member in accordance with a first preferred embodiment of the present invention.

Referring to FIG. 8, basically the first embodiment key member 130 includes a first projection 131 to be projected for a length from the crank pin 110 even when the compressor is not in operation, and a second projection 132 to be projected for a length from the crank pin 110. The key member 130 includes a first stopper 133 for defining a projection length of the first projection part. The second projection 132 is disposed in the crank pin 110 to be far from the center 22a of the crank shaft for receiving a greater centrifugal force, leading the first projection 131 disposed near to the center 22a, relatively.

In the first embodiment, as shown in FIG. 5A, the first projection 131 is projected by its own weight when the compressor is not in operation, so as to be engaged with one of the steps 123a and 123b, and is maintained to keep an engaged state with the steps when the compressor is in operation. A length of the projection is limited as the first stopper 133 of the key member 130 interferes with an inner wall of the crank pin 110. For more stable operation, it is preferable that the length of the first projection is at least a half of a minimum width of the steps 123a and 123b.

The second projection is projected in a direction opposite to the first projection, to engage with the other step during operation. According to this, the first and second projections 131 and 132 of the key member 130 are barred on the same time with the eccentric sleeve 120. Such movement and projection of the second projection is made in a direction of a centrifugal force (i.e., an extension line between the centers 23a and 110a) as a component of the centrifugal force occurred along the key member 130 becomes greater than a component of the weight during operation. In this instance, the eccentric sleeve 120 rotates round the crank pin 110 for changing eccentricity when the compressor changes a direction of rotation. In order not to interfere the rotation of the eccentric sleeve 120, the second projection is required to have a length not projected from an outer circumference of the crank pin when the compressor is not in operation.

The first and second projections 131 and 132 are engaged with the steps 123a and 123b alternately, particularly, the second projection 132 is engaged with the steps 123a and 123b during operation. Since the key member 130 is disposed on the extension line between the centers 23a and 110a or at least parallel thereof, contact positions of the key member 130 to the steps 123a and 123b vary if thickness 't1' and 't2' of the first and second projections differ. Therefore, the thickness 't1' and 't2' of the first and second projections 131 and 132 are required to have the same thickness for accurate engagement with the steps 123a and 123b. Though a section of the key member 130 is circular in the drawing and description of the present invention, any form of a section, such as square or hexagonal, that can make engagement with the steps 123a and 123b, may be used.

Figure 9:
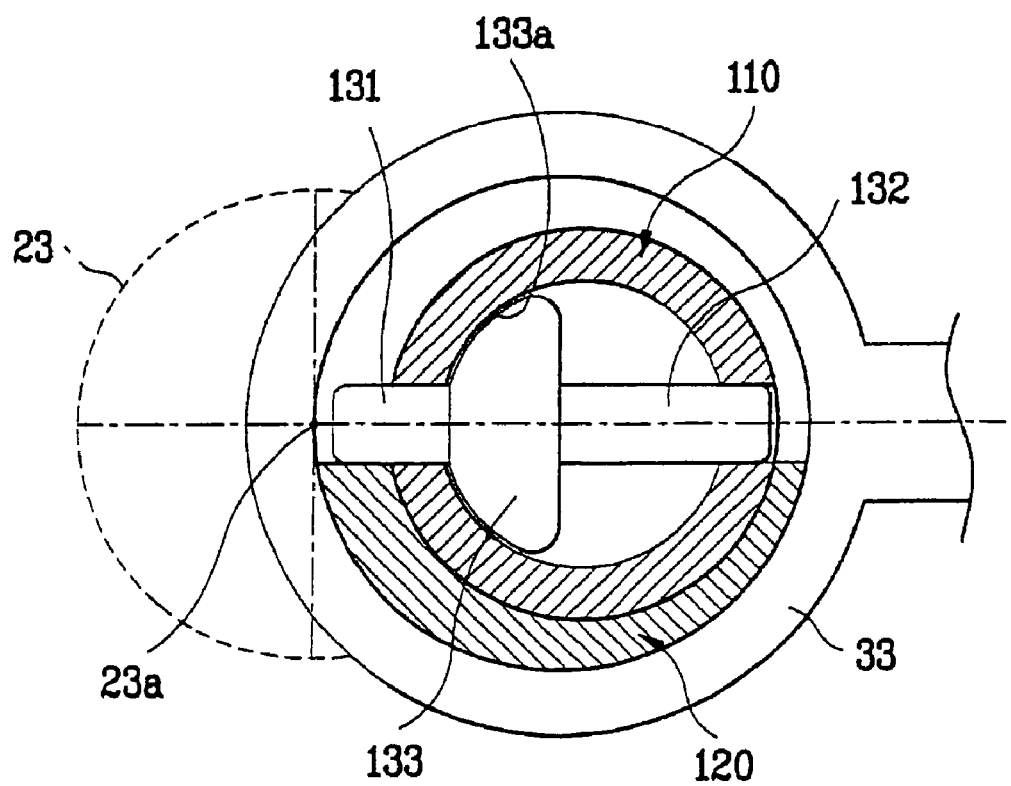
FIG. 9 illustrates a plan view of a key member fitted in a crank pin modified from one in FIG. 8.

As shown in FIG. 9, a contact surface 133a of the first stopper 133 may have a form in conformity with an inner circumferential surface of the crank pin 110, so that the key member 130 is engaged with the crank pin 100 exactly, and makes more smooth operation owing to an increased weight thereof (i.e., an increased centrifugal force makes an easy projection of the second projection 132). The first stopper 133 may be formed as a unit with the key member 130, or separately to be fitted to the key member 130. Examples of such separate type first stopper 133 are shown in FIGS. 10A and 10B.

Figure 10A:
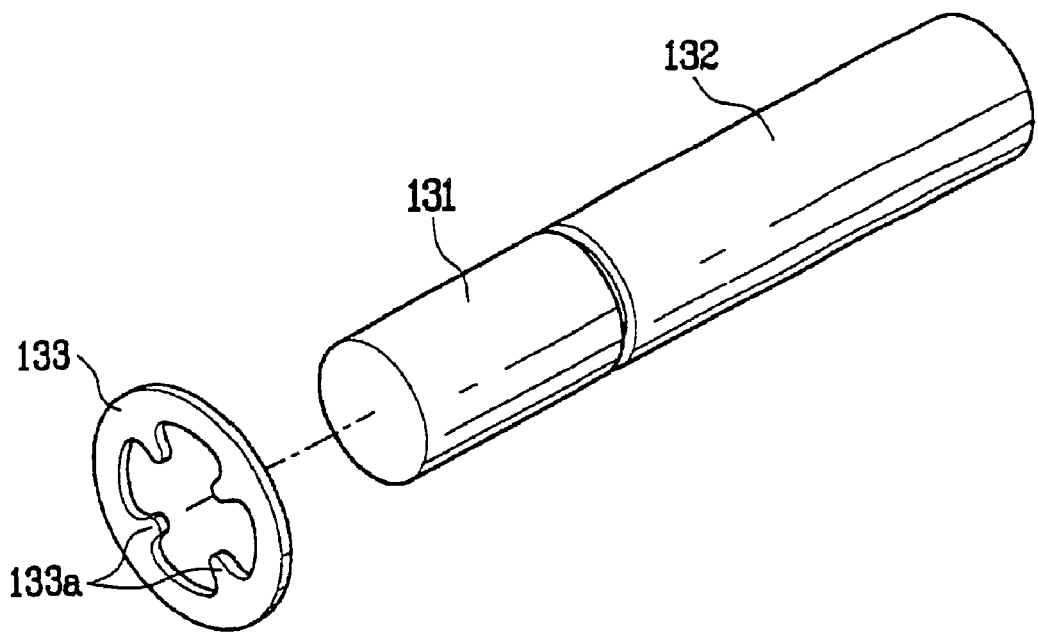
FIGS. 10A and 10B illustrate perspective views of modified key members each having detachable first stopper.
Figure 10B:
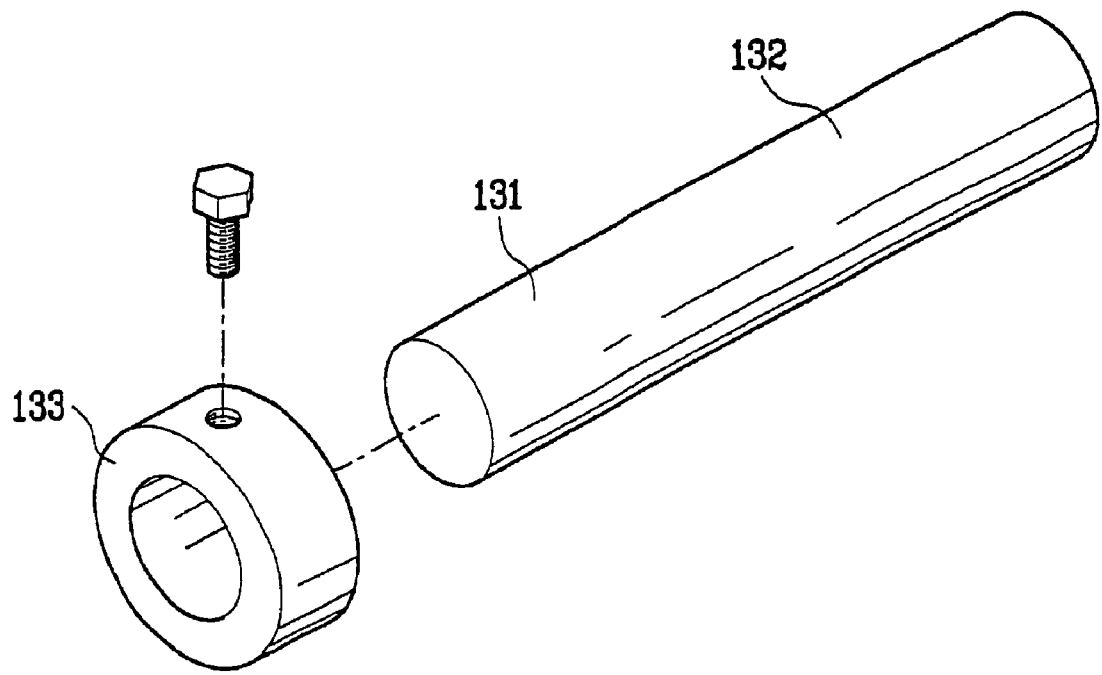

Referring to FIG. 10A, the first stopper 133 may include projections 133a extended inward in a radial direction for inserting in a circumferential groove in coupling with the key member 130. Or, as shown in FIG. 10B, the ring formed first stopper 133 may be fixed on the key member 130. This separation type stopper 133 permits to fit the key member 130 to the crank pin 110 even when both of the key member fitting parts 111a and 111b are through holes, by placing the stopper 133 inside the crank pin 110 and inserting the key member 130 through the through holes.

In the meantime, as explained, the projection length of the second projection 132 in the key member 130 can be adjusted for some extent by a weight component of the key member 130 exerting opposite to the centrifugal force component. However, the sharp acceleration occurred on the crank shaft 23 and the crank pin 110 at starting of the compressor causes a substantial momentary centrifugal force exerted to the key member 130. This centrifugal force makes an excessive projection of the second projection 132 enough to cause the first projection 131 broken away from the fitting part 111. Therefore, it is preferable that the key member 130 further includes a second stopper 134 for limiting the projection length of the second projection 132 from the crank pin 110.

Figure 11A:
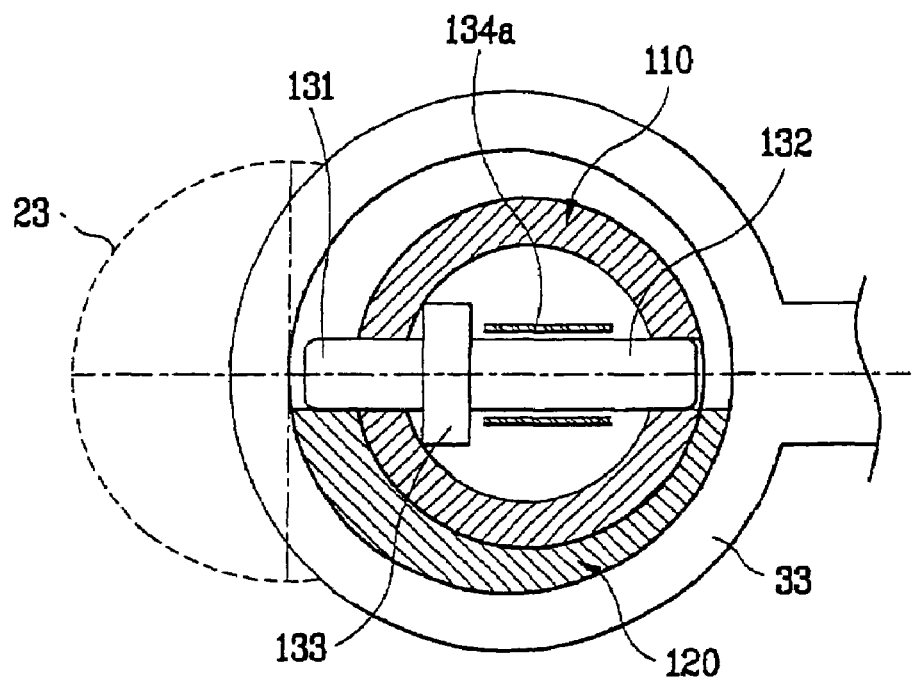
FIGS. 11A~11C illustrate plan views of modified key members each having second stopper.
Figure 11B:
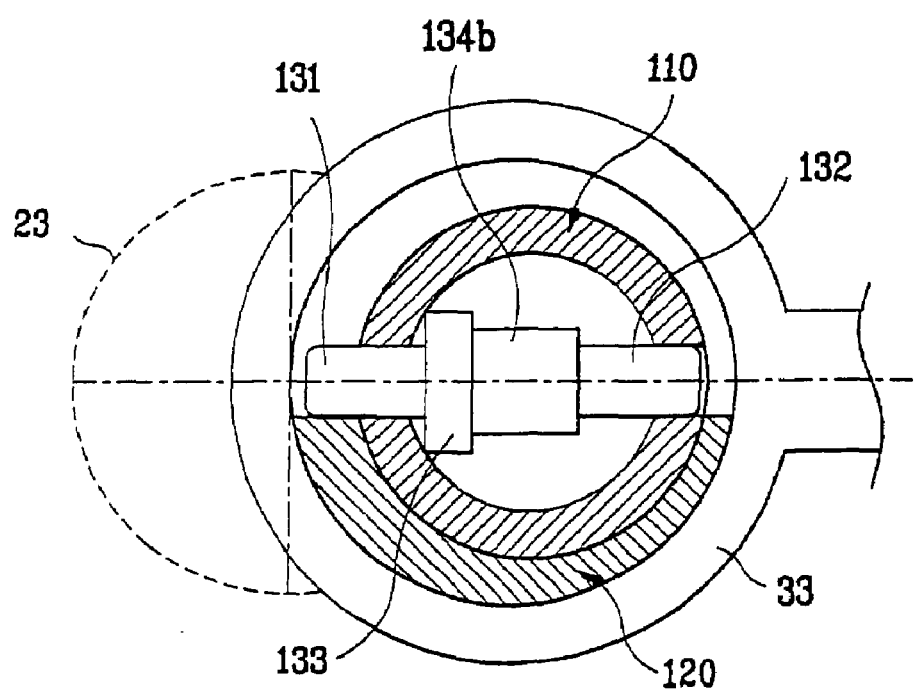
Figure 11C:
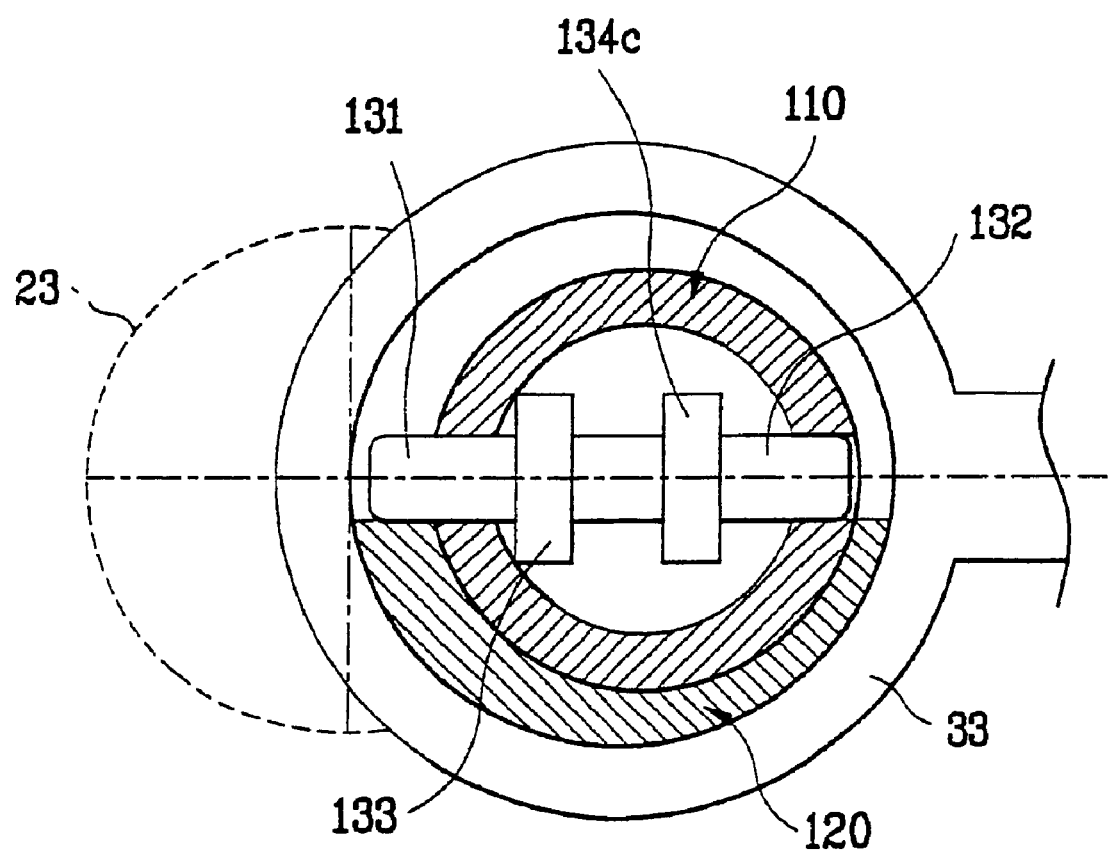

Referring to FIG. 11A, the second stopper 134 may be a hollow tube member 134a movably fitted in a length direction of the second projection 132. The second stopper 134a comes to contact both with the first stopper 133 and an inside wall of the crank pin 110 when the key member 130 moves in a direction of the centrifugal force, thereby preventing the second projection 133 not to be projected more than a certain length. As shown in FIG. 11B, the second stopper 134 may be at least an extension 134b having a thickness greater than a thickness of the second projection 132. That is, the second stopper 134b in FIG. 11B is a lengthwise extension of the first stopper 133, actually. Or, as shown in FIG. 11C, the second stopper 134 may be a radial direction extension 134c of the second projection 132 to a required thickness, having a form substantially identical to the first stopper 133. Similar to variations to the first stopper 133 described in association with FIGS. 10A and 10B, the stoppers 134b and 134c may be separate members fixed to the key member 130, respectively.

SECOND EMBODIMENT

Figure 12A:
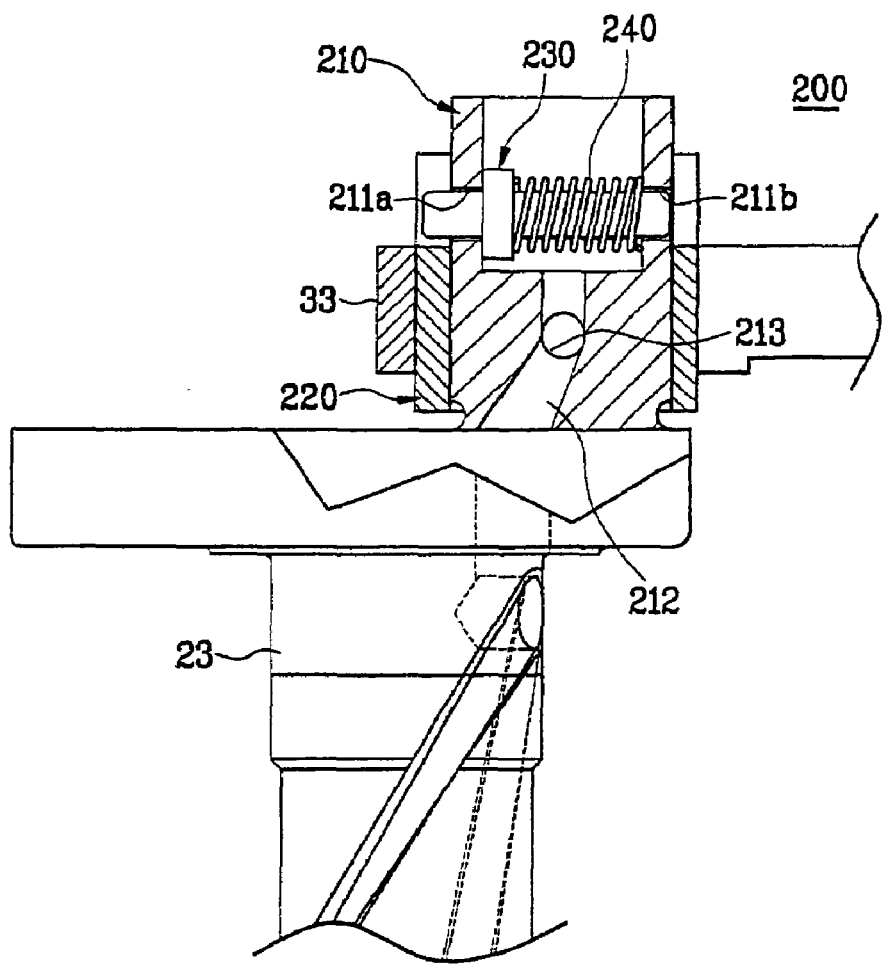
FIG. 12A illustrates a side view with a partial section of a dual capacity compressor in accordance with a second preferred embodiment of the present invention.
Figure 12B:
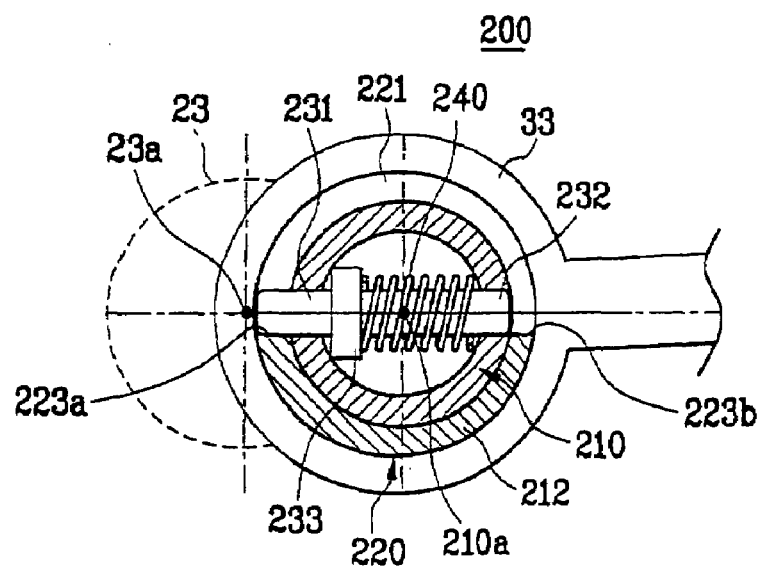
FIG. 12B illustrates a plan view with a partial section of a dual capacity compressor in accordance with a second preferred embodiment of the present invention.

The second embodiment dual capacity compressor of the present invention has a key member fitting structure different from the first embodiment compressor on the whole. FIGS. 12A and 12B illustrate side view and plan view of the dual capacity compressor in accordance with a second embodiment of the present invention respectively, and FIGS. 13~15c illustrate major individual components thereof. Alike the first embodiment, the individual components are shown in an assembled state including partial sections for easy and clarity of description. The second embodiment will be explained with reference to the above drawings.

The dual capacity compressor 200 in accordance with a second embodiment of the present invention includes a crank pin 210 having one pair of opposite and parallel key member fitting parts 211, an eccentric sleeve 220 for partial limitation of rotation of a key projection, and a key member 230 fitted through the fitting parts 211 such that at least a part of the key member 230 is projected from the crank pin 210. In addition to this, the second embodiment compressor includes an elastic member 240 for regulating a position of the key member 230 when the compressor is in, or not in, operation. As shown, different from the first embodiment, since the key member in the second embodiment is fitted horizontally, a separate member, such as the elastic member 240, is required. Since components of the second embodiment are substantially identical to the first embodiment, the second embodiment will be explained with reference to distinctive features.

The crank pin 210 includes an oil passage 212 and an oil supply hole 213 in a lower part thereof, as well as the key member fitting parts 211a and 211b. As shown in FIG. 12B, the fitting parts 211a and 211b are positioned on an extension line between the centers 23a and 210a, or at least parallel thereto on the same horizontal plane as shown in FIG. 12A. Consequently, the key member 230 in the fitting parts 211 is influenced from the centrifugal force exerted on the extension line between the centers 23a and 210a in a length direction of the key member 230. The fitting parts 211a and 211b may actually be through holes, or may includes at least one slot extended from a top end of a wall of the crank pin 210 to a required position.

Figure 13:
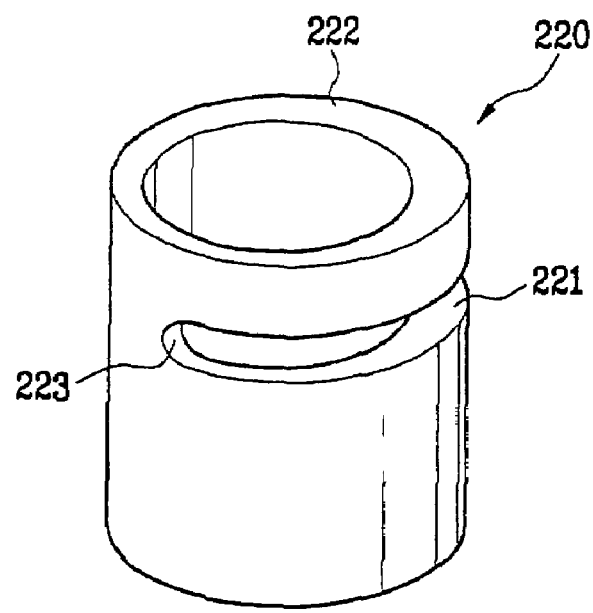
FIG. 13 illustrates a perspective view of a modified version of the eccentric sleeve in accordance with a second preferred embodiment of the present invention.

Identical to the first embodiment, the eccentric sleeve 220 includes a track part 221, a limiting part 222, and two steps 223 between the track part 221 and the limiting part 222. The track part 221 may be, not only the cut away part in FIG. 7A, but also a pass through hole extended along a circumferential direction for a length at a depth from the top end as shown in FIG. 13. Such a form of track part 221 is made available as the key member 230 is fitted in a horizontal direction, for prevention of the key member 230 from vertical falling off by barring the projection when the key member 230 is stopped. The steps 223a and 223b may be formed parallel to an extension line between the centers 23a and 210a, or sloped an angle. The key member 230 includes a first projection 231, a second projection 232, and a first stopper 233. The first projection 231 is projected from the crank pin 210 regardless of operation of the compressor (stop or operation) by an elastic force of the elastic member, and engaged with one of the steps 223a or 223b. For this, the elastic member 240 is fitted on the second projection 232 to support the first stopper 233 together with the inside wall of the crank pin 210. When the centrifugal force generated along the key member 230 becomes greater than the elastic force during operation, the second projection 232 moves and projected in a direction of the centrifugal force (i.e., a direction of the extension line between the centers 23a and 210a).

Figure 14:
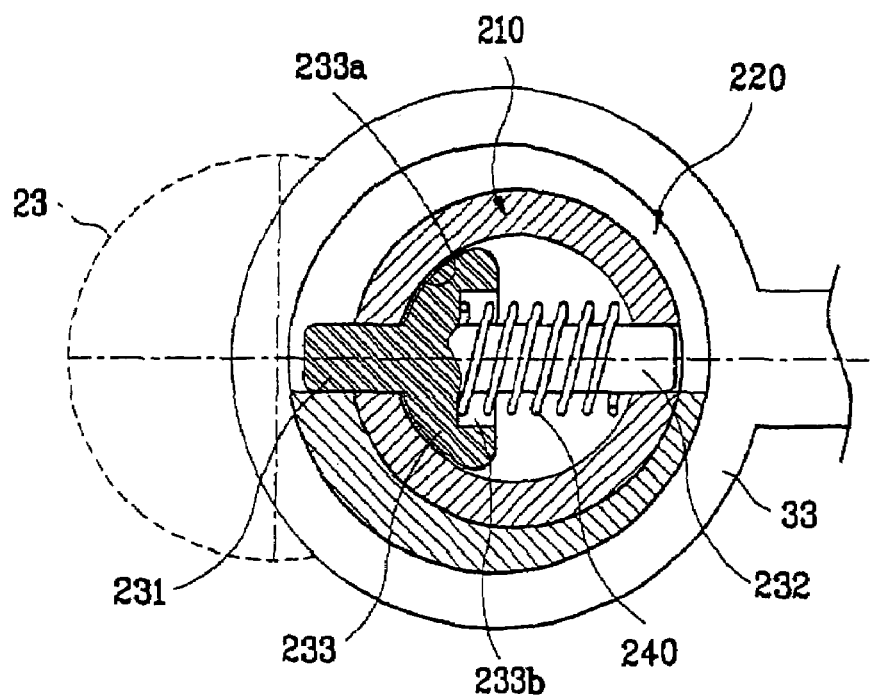
FIG. 14 illustrates a plan view of a modified version of a key member fitted in a crank pin in accordance with a second preferred embodiment of the present invention.

In the meantime, as shown in FIG. 14, the first stopper 233 has a contact surface 233a in conformity with an inside surface of the crank pin 210, and preferably a receiver 233b for the elastic member 240. The contact surface 233a and the receiver 233b assist stable operation of the key member 230, actually. The first stopper 233 may or may not be formed as a unit with the key member 230.

A projection length of the second projection can be regulated by the elastic force of the elastic member 240 during regular operation. However, for preventing the second projection member from being broken off by the momentary centrifugal force described before, the key member 230 further includes the second stopper 234.

Figure 15A:
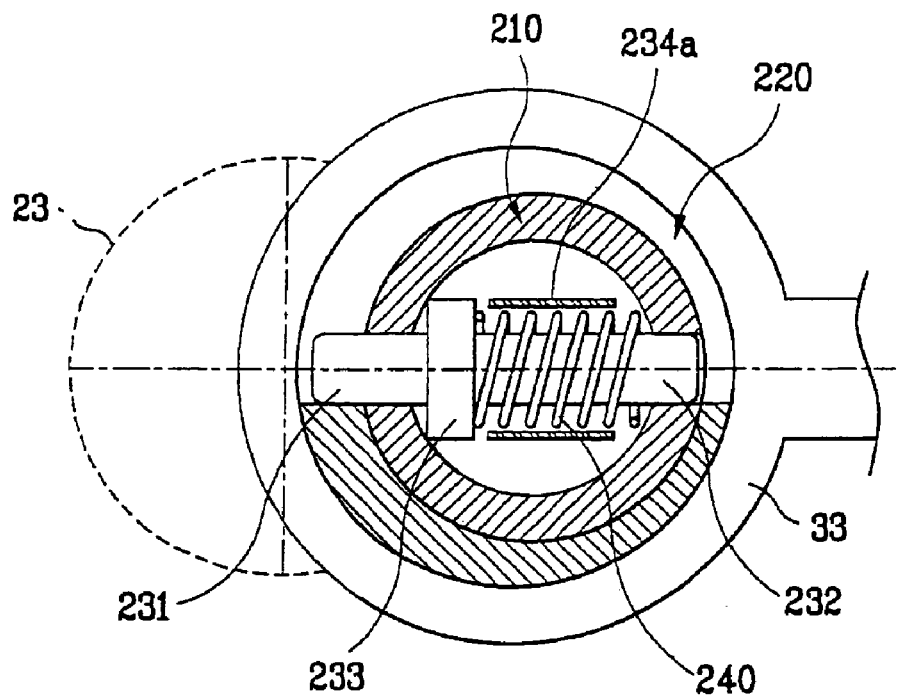
FIGS. 15A~15C illustrate plan views of modified versions of key members each having second stopper in accordance with a second preferred embodiment of the present invention.
Figure 15B:
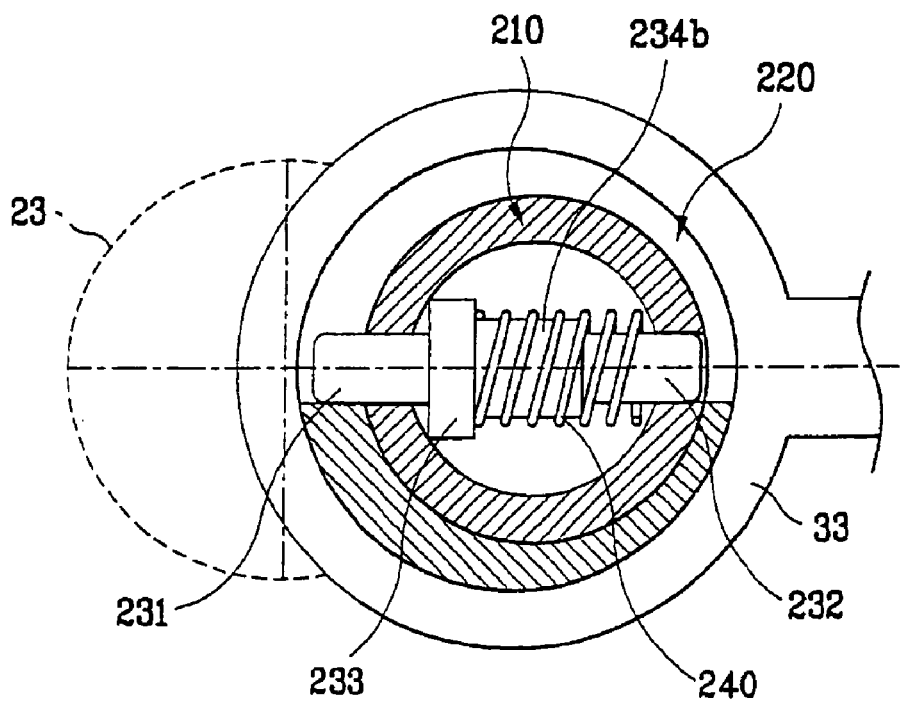
Figure 15C:
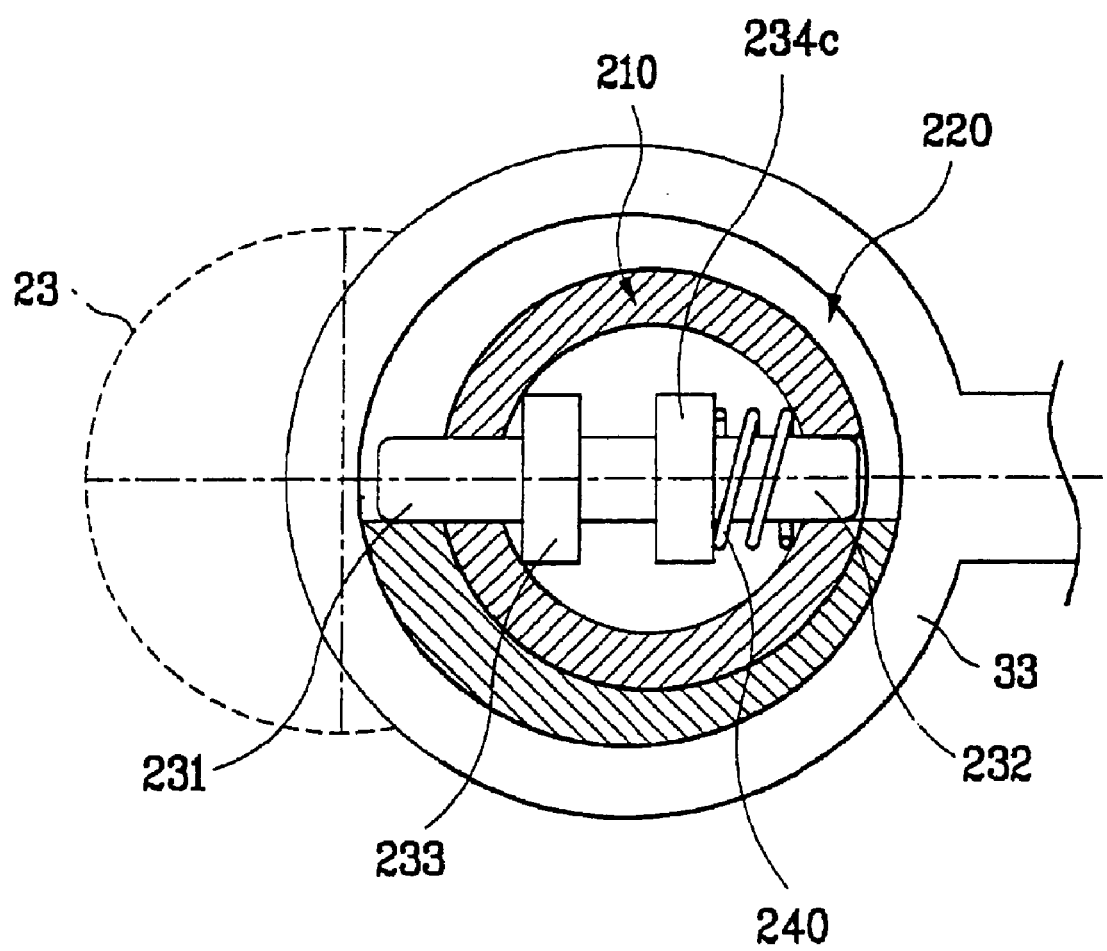

Referring to FIGS. 15A~15C, the second stopper 234 is formed identical to the first embodiment. That is, the second stopper 234 in the second embodiment may be, a hollow tube member 234a on the second projection 232 fitted movably in a longitudinal direction, a longitudinal extension 234b of the first stopper 233, or a radial direction extension 234c of the second projection 232 having a thickness. The elastic member 240 makes a relative position different from the first embodiment. In detail, in a case of the hollow tube 234a, the elastic member 240 is disposed between the second stopper 234a and the second projection 232. In a case of the longitudinal extension 234b, the elastic member 240 is fitted to an outer circumference of the second stopper 234b, and in a case of radial direction extension 234c, the elastic member is fitted between the second stopper 234b and an inner surface of the crank pin 210.

Figure 16A:
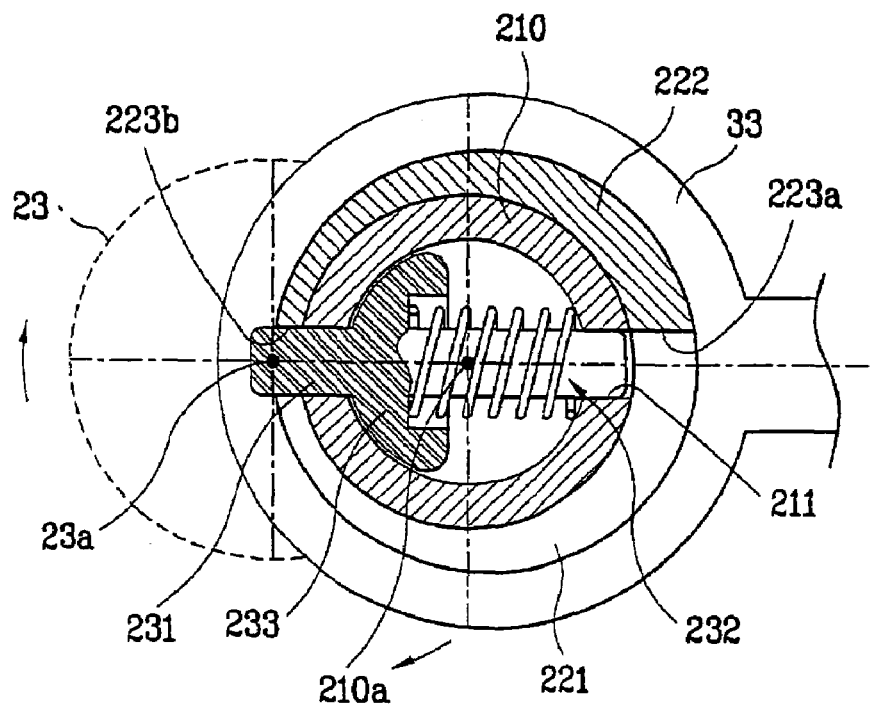
FIGS. 16A and 16B illustrate plan views showing operation of key parts of a dual capacity compressor in regular direction rotation in accordance with a second preferred embodiment of the present invention; and, FIGS. 17A and 17B illustrate plan views showing operation of key parts of a dual capacity compressor in reverse direction rotation in accordance with a second preferred embodiment of the present invention.
Figure 16B:
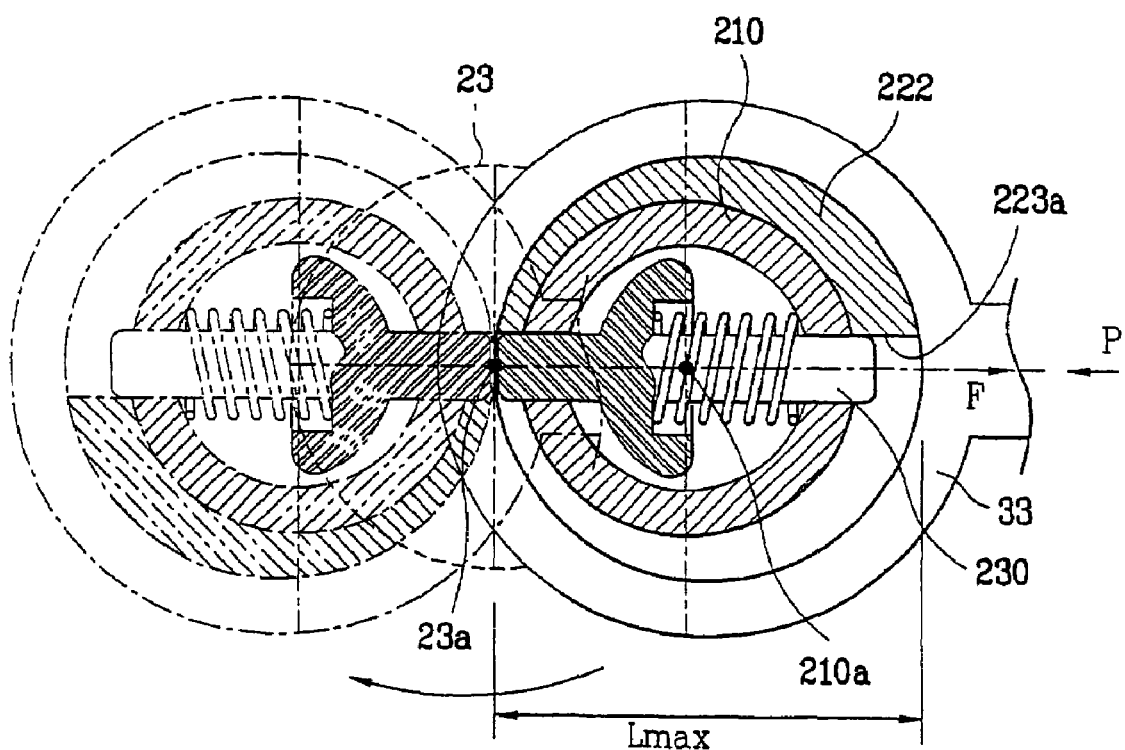
Figure 17A:
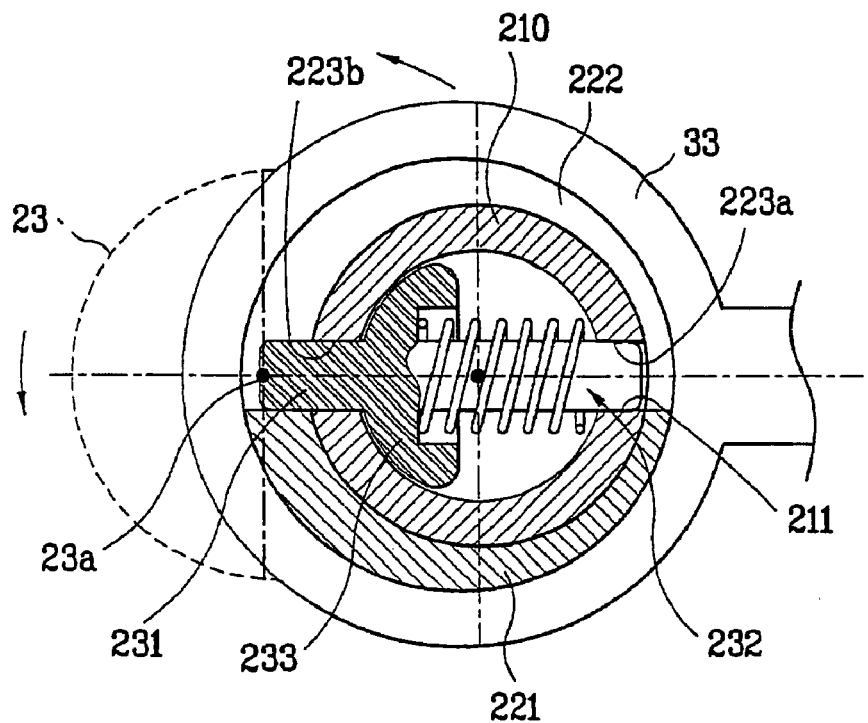
Figure 17B:
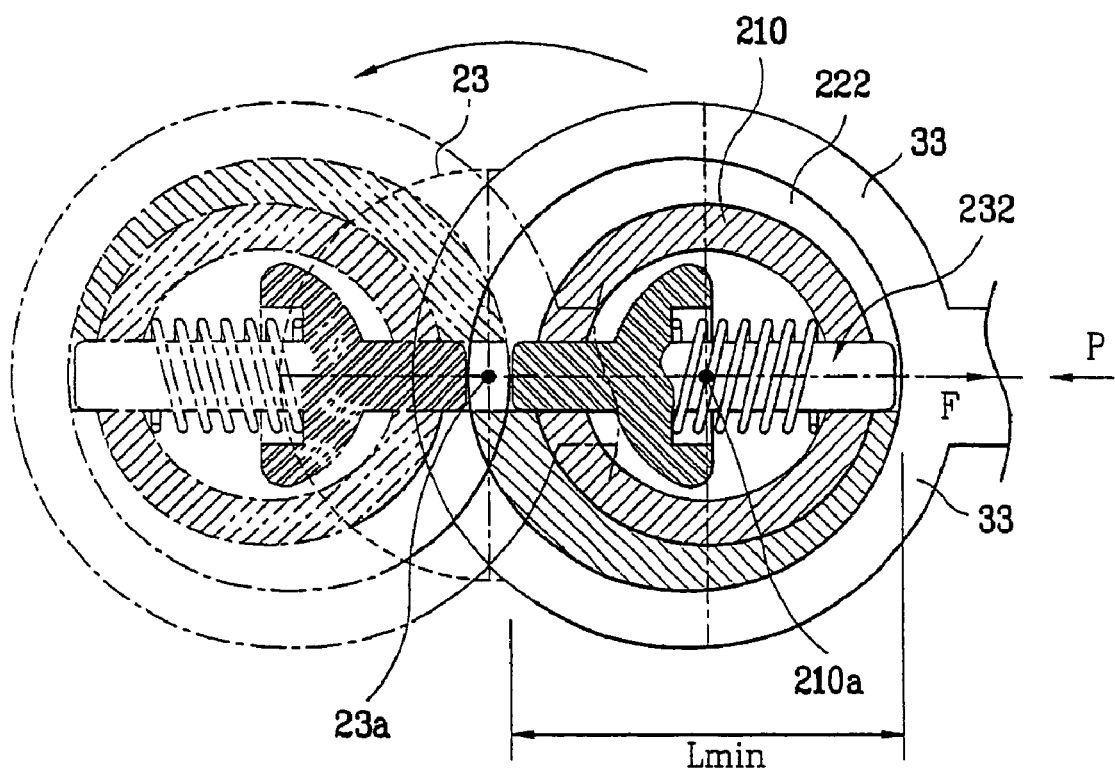

The operation of the first or second embodiment compressor of the present invention will be explained with reference to related drawings. Because the first and second embodiments differ in the key member 130 or 230 movement regulating methods, such as by the key member weight from the sloped orientation thereof, or by the elastic force, but are almost identical in actual operation, the operation will be explained based on the second embodiment for avoiding duplication of explanation. FIGS. 16A and 16B illustrate plan views showing operation of key parts of a dual capacity compressor in regular direction rotation in accordance with a second preferred embodiment of the present invention, and FIGS. 17A and 17B illustrate plan views showing operation of key parts of a dual capacity compressor in reverse direction rotation in accordance with a second preferred embodiment of the present invention.

FIG. 16A illustrates a relative position between the key member 230 and the eccentric sleeve 220 when the crank shaft 23 starts to rotate in a clockwise direction, and the first projection 231 is projected from the crank pin 210 by the elastic force, and engaged with the step 223b on a thin side of the eccentric sleeve 220. On the same time with this, components 210, 220, and 230 except the connecting rod 33 connected to the piston starts to rotate in a clockwise direction. When an angular speed of the rotation reaches to a preset level, as shown in FIG. 16B, the key member 230 moves along the extension line between the centers 23a and 210a by the centrifugal force F. According to this, the second projection 232 is engaged with the step 223a on a thick side of the eccentric sleeve 220, while the first projection 231 is also kept in contact with the step 223b on the same time. Such a simultaneous multiple point contact makes a complete engagement between the key member 230 and the eccentric sleeve 220. Therefore, even if any external force P from re-expansion of the working fluid after the compression or other force is transmitted through the connecting rod 33 in a regular direction rotation, there will be no relative rotation occurred between the crank pin 210 and the eccentric sleeve 220. Even if the local rotating moment is occurred at the eccentric sleeve 220, the relative rotation to the crank pin 210 can be prevented. Referring to FIG. 7B, a part of the drawing in solid lines illustrates a top dead center state, and a part of the drawing in dashed lines illustrates a bottom dead center state, wherein the eccentric sleeve 220 is oriented such that a maximum eccentricity is occurred in the regular direction rotation, when the piston has the maximum stroke Lmax, to provide the maximum compression capacity.

In the meantime, when the crank shaft 23 and the crank pin 210 unitary therewith start to rotate in a reverse direction, i.e., in a counter clockwise direction, the eccentric sleeve 220 is rotated in a regular direction between, and relative to the crank pin 210 and the connecting rod 33. According to this, as shown in FIG. 17A, the step 223a on the thick side of the eccentric sleeve 220 is engaged with the first projection 231. As shown in FIG. 17B, identical to the case of regular direction rotation, when an angular rotation speed reaches to a preset level, the second projection 232 is engaged with the step 223b on the thin side of the eccentric sleeve 220 by the centrifugal force F, making the multiple contact state between the eccentric sleeve 220 and the key member 230. Therefore, even if any external force P applied to the piston by the working fluid during the compression or other force is transmitted in the reverse direction rotation, there will be no relative rotation occurred between the crank pin 210 and the eccentric sleeve 220. In the meantime, as shown in FIG. 7B, the eccentric sleeve 220 is disposed to have a minimum eccentricity in the case of the reverse direction rotation, it is understandable that the compressor has a minimum compression capacity.

Eventually, as the compressor of the present invention excludes relative rotation between the crank pin and the eccentric sleeve, elements maintaining the eccentricity, completely, the compressor of the present invention can make a stable operation in any operative states, i.e., in the regular or reverse direction rotation.

It will be apparent to those skilled in the art that various modifications and variations can be made in the dual capacity compressor of the present invention without departing from the spirit or scope of the invention. Thus, it is intended that the present invention cover the modifications and variations of this invention provided they come within the scope of the appended claims and their equivalents.

INDUSTRIAL APPLICABILITY

The multiple point contact between the eccentric sleeve and the key member during operation leads the crank pin having the key member positioned therein caught with the eccentric sleeve completely. Therefore, there will be no relative movement between the eccentric sleeve and the crank pin even if any external or internal cause is occurred, that allows a stable operation without any output variation of the compressor. In more detail, as the eccentricity is fixed, a designed compression capacity can be obtained without change. And, a friction loss between the crank pin and the eccentric sleeve caused by the relative movement can be prevented. At the end, such a stable operation brings about an increased efficiency of the dual capacity compressor. In addition to this, noise occurred from the relative movement can be prevented, and components lifetime can be prolonged. And, since a structure of the present invention is simple and fabrication thereof is easy, a productivity can be increased.

What is claimed is:

1. A dual capacity compressor, comprising:
   a power generating part, comprising a reversible motor and a crank shaft coupled to the motor;
   a compression part, comprising a cylinder, a piston configured to be inserted into the cylinder, and a connecting rod configured to connect to the piston;
   a crank pin positioned eccentric to a center of the crank shaft;
   an eccentric sleeve configured to be rotatably installed between the crank pin and an end of the connecting rod; and
   a key member configured to cause the eccentric sleeve to be completely caught with respect to at least one of a plurality of elements of the compressor which are positioned proximate the eccentric sleeve during both clockwise and counter clockwise rotation of the motor, wherein a compression capacity is varied based on a position of the eccentric sleeve as a direction of rotation of the motor is changed, and wherein the key member is configured to prevent relative movement of the eccentric sleeve and the at least one of the plurality of elements of the compressor during operation regardless of the direction of rotation of the motor.

2. The dual capacity compressor as claimed in claim 1, wherein the key member is configured to cause the eccentric sleeve to be completely caught with respect to at least one of the crank pin and the connecting rod.

3. The dual capacity compressor as claimed in claim 1, wherein the key member is configured to catch the eccentric sleeve at a plurality of points.

4. The dual capacity as claimed in claim 1, wherein the key member is configured to catch the eccentric sleeve at two points during operation.

5. The dual capacity as claimed in claim 4, wherein the two points are determined based on a center of the crank pin and a center of the crank shaft.

6. The dual capacity compressor as claimed in claim 1, wherein a length of the key member is greater than an outer diameter of the crank pin.

7. The dual capacity compressor as claimed in claim 1, wherein the key member is configured to catch at least the eccentric sleeve.

8. The dual capacity compressor as claimed in claim 7, wherein the key member is configured to catch the eccentric sleeve when the compressor is in operation.

9. The dual capacity compressor as claimed in claim 1, wherein the key member comprises:
   a first projection configured to project from the crank pin; and
   a second projection configured to project from the crank pin when the compressor is in operation.

10. The dual capacity compressor as claimed in claim 1, wherein the key member is configured to be moved in response to a centrifugal force generated due to rotation of the crank shaft.

11. The dual capacity compressor as claimed in claim 1, wherein the key member is aligned with a direction of a centrifugal force generated due to rotation of the crank shaft.

12. The dual capacity compressor as claimed in claim 1, wherein the key member is aligned with a line connecting a center of the crank shaft and a center of the crank pin.

13. The dual capacity compressor as claimed in claim 1, wherein the key member comprises a stopper configured to limit movement of the key member installed in the crank pin.

14. The dual capacity compressor as claimed in claim 13, wherein the stopper comprises a first stopper configured to limit movement of the key member in a first direction.

15. The dual capacity compressor as claimed in claim 14, wherein the stopper further comprises a second stopper configured to limit movement of the key member in a second direction.

16. The dual capacity compressor as claimed in claim 1, wherein the key member comprises an elastic member configured to position the key member such that a portion of the key member projects out of the crank pin.

17. The dual capacity compressor as claimed in claim 1, wherein the crank pin comprises key member fitting part.

18. The dual capacity compressor as claimed in claim 17, wherein the key member fitting part comprises a pair of pass through holes formed through a wall of the crank pin.

19. The dual capacity compressor as claimed in claim 1, wherein the eccentric sleeve comprises:
   a track part formed along a circumference of the eccentric sleeve and configured to facilitate relative rotation of the eccentric sleeve and the key member; and
   a limiting part formed adjacent to the track part and configured to limit rotation of the key member.

20. The dual capacity compressor as claimed in claim 17, wherein the track part comprises a cut away portion extending along a circumference of the eccentric sleeve and at a predetermined distance from an upper portion of the eccentric sleeve.

21. The dual capacity compressor as claimed in claim 19, wherein the eccentric sleeve further comprises a step formed at each location where the track part meets the limiting part.

22. The dual capacity compressor as claimed in claim 21, wherein each step is formed parallel to a line connecting a center of the crank shaft and a center of the crank pin.

23. The dual capacity compressor as claimed in claim 21, wherein each step is positioned a predetermined distance from a line connecting a center of the crank shaft and a center of the crank pin.

24. The dual capacity compressor as claimed in claim 23, wherein the predetermined distance is half of a thickness of the key member.

25. A dual capacity compressor, comprising:
   a power generating part, comprising a reversible motor and a crank shaft coupled to the motor;
   a compression part, comprising a cylinder, a piston configured to be inserted into the cylinder, and a connecting rod configured to connect to the piston;
   a crank pin positioned eccentric to a center of the crank shaft;
   an eccentric sleeve configured to be rotatably installed between the crank pin and an end of the connecting rod; and
   a key member configured to maintain a relative position of the eccentric sleeve so as to prevent relative movement of the eccentric sleeve and a plurality of elements of the compressor positioned adjacent the eccentric sleeve during both clockwise and counter clockwise rotation of the motor.

26. The dual capacity compressor as claimed in claim 25, wherein the key member is configured to continuously maintain the relative position of the eccentric sleeve, and wherein the key member is configured to further maintain a position of the eccentric sleeve when the compressor is in operation.

27. The dual capacity compressor as claimed in claim 25, wherein the key member is configured to engage the eccentric sleeve.

28. The dual capacity compressor as claimed in claim 25, wherein the key member is configured to continuously engage the eccentric sleeve, and wherein the key member is configured to further engage the eccentric sleeve when the compressor is in operation.

29. The dual capacity compressor as claimed in claim 25, wherein a compression capacity is varied based on the relative position of the eccentric sleeve as a direction of rotation of the motor is changed.

30. The dual capacity compressor as claimed in claim 25, wherein the plurality of elements of the compressor positioned adjacent the eccentric sleeve comprise at least the crank pin and the connecting rod.

* * * * *